May 2, 1950  E. T. LINDEROTH  2,506,273
PARTICLE SEPARATOR

Filed Jan. 2, 1947  3 Sheets-Sheet 1

INVENTOR
ERIK TORVALD LINDEROTH
BY
ATTORNEY

May 2, 1950   E. T. LINDEROTH   2,506,273
PARTICLE SEPARATOR
Filed Jan. 2, 1947   3 Sheets-Sheet 2
FIG. 3
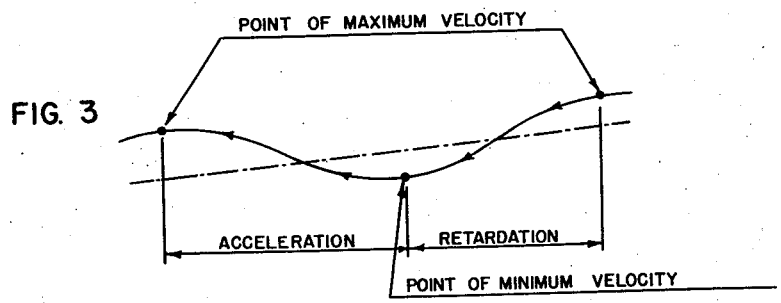
FIG. 4 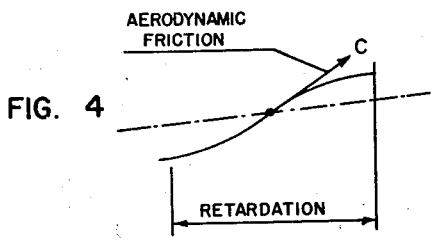 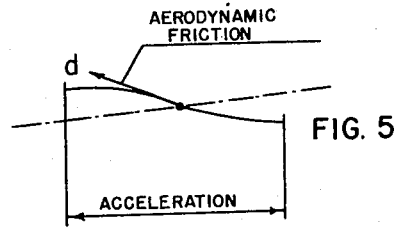 FIG. 5
FIG. 6 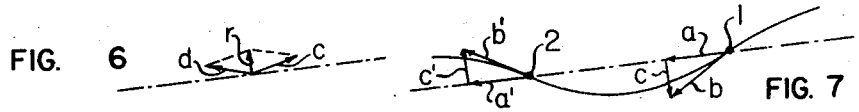 FIG. 7
FIG. 8
INVENTOR
ERIK TORVALD LINDEROTH
BY
ATTORNEY

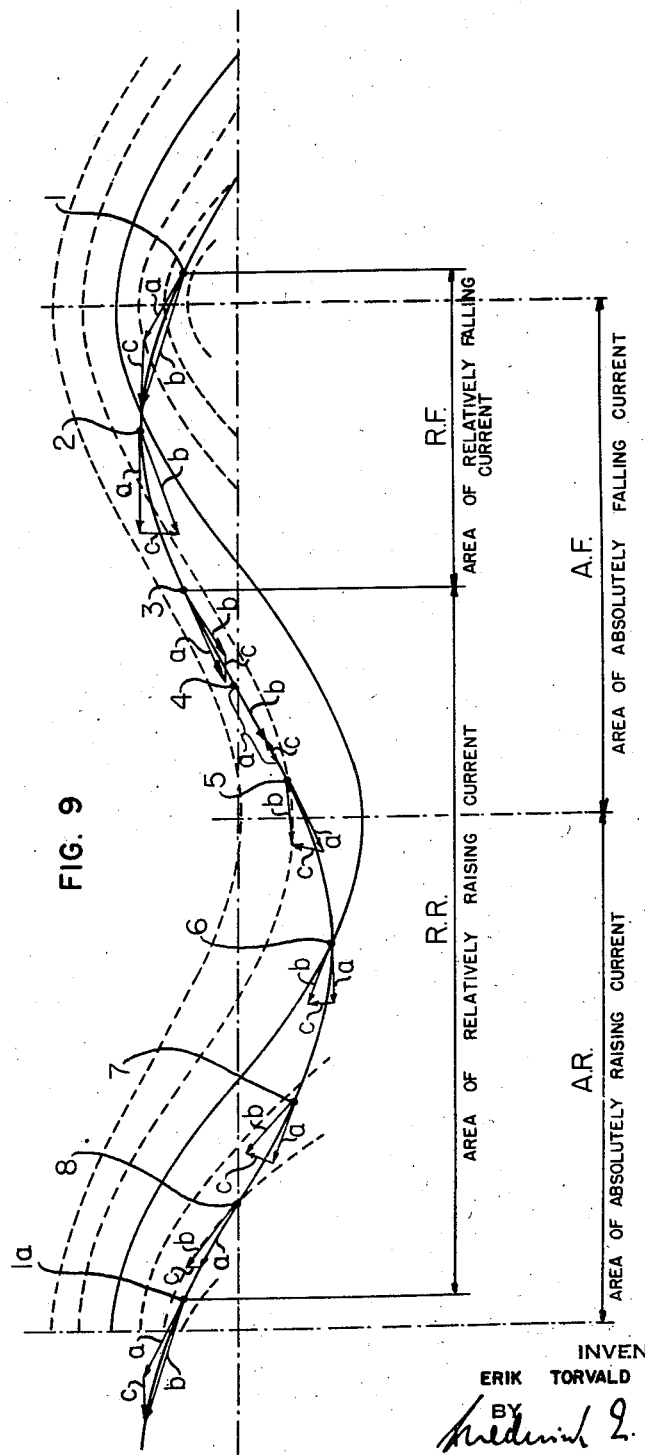

Patented May 2, 1950

2,506,273

UNITED STATES PATENT OFFICE 2,506,273

PARTICLE SEPARATOR

Erik Torvald Linderoth, Stockholm, Sweden, assignor to Aktiebolaget Linderoths Patenter, Stockholm, Sweden Application January 2, 1947, Serial No. 719,819
In Sweden February 22, 1946

8 Claims. (Cl. 183—75)

This invention relates to means of separating solid particles in a current of a gaseous fluid or medium, more particularly the invention relates to means by which a fluid current containing solid particles to be separated is directed against a filter surface at an acute angle so that the larger portion of the fluid current containing a reduced fraction of particles passes through the filter perforations while the smaller portion of the fluid current containing the greater fraction of particles is guided along the filter surface toward discharge means.

One of the objects of the invention is a novel means to produce an aerodynamic force directed away from the filter surface for preventing or at least substantially reducing the passage of solid particles through the filter perforations.

Another object of the invention is to provide novel means by which solid particles are held floating or suspended in the fluid current, thereby preventing the passage of an appreciable portion of said particles through the filter perforations and protecting the filter surface against abrasion.

Another object of the invention is to provide novel means by which particles can be separated of a magnitude as small as 10µ (at a volumetric weight of 1 g./1 cm.³) which cannot be separated by methods and means as hitherto known.

The previously enumerated objects and other objects, features and advantages of the invention, some of which will hereinafter be pointed out, are attained according to a now preferred embodiment of the invention by selecting velocity and direction of a gaseous fluid current containing solid particles to be separated and the spacing of the filter perforations so that a wave or pulsating movement with a frequency of 1,000 to 15,000 oscillations per second is imparted to the fluid current during its travel along the filter surface.

Extensive tests have shown that as a result of current oscillations within the previously defined range of frequency, an aerodynamic force is created strong enough to maintain particles suspended in the fluid current at a distance from the filter surface and capable of predominately affecting particles of a magnitude so small as to cause the said particles to participate with a certain lag in phase in the oscillations of the fluid current. The latter effect is of great importance for the separation of very small particles which can not be separated by methods and means hitherto known as will be explained more fully hereinafter.

Particularly advantageous results can be attained by providing a guiding duct for the fluid current decreasing in cross section in the direction of the current flow and by selecting the ratio of the cross section reduction relative to the area of filter perforations so that the total area of filter perforations after each cross section, as seen in the direction of the current flow, is greater than the area of each selected cross section minus the cross sectional area of the discharge means provided at the end of the filter area. As a result, the drop of pressure across the filter perforations is comparatively small relative to the dynamic pressure exerted by the component of fluid current velocity parallel to the filter surface, the fluid current having a component of velocity parallel to the filter surface and a second component vertically thereto.

Extensive tests have shown that such comparatively small pressure drop causes a strong aerodynamic force directed away from the filter surface.

The invention will be more clearly understood with reference to the accompanying drawings which illustrate by way of example and not by way of limitation a now preferred construction for carrying out the method of the invention.

In the drawings:

Fig. 3 is a graph showing a portion of the wave movement of the fluid current.

Figs. 4 and 5 show graphs of the retardation and acceleration of a particle capable of following completely the wave movement of the fluid current.

Fig. 6 is a diagram showing the resultant of the force affecting a particle as indicated in Figs. 4 and 5.

Fig. 7 is a graph of the orbit of a particle of a magnitude traveling substantially independently of the wave movements of the fluid current.

Fig. 8 shows a diagram of the resultant force affecting a particle according to Fig 7.

Fig. 9 shows a graph illustrating certain particle orbits, and

Figure 2A:
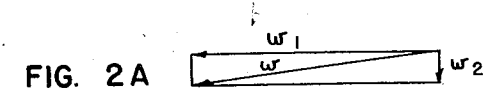
Fig. 2a is a diagram showing the components of the fluid current containing solid particles to be separated.
Figure 2:
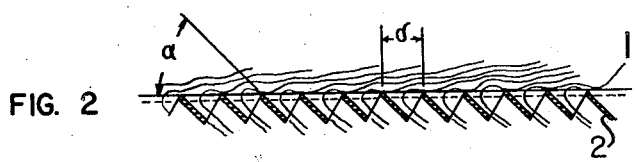
Fig. 2 is a section along line 2—2 of Fig. 1.
Figure 1:
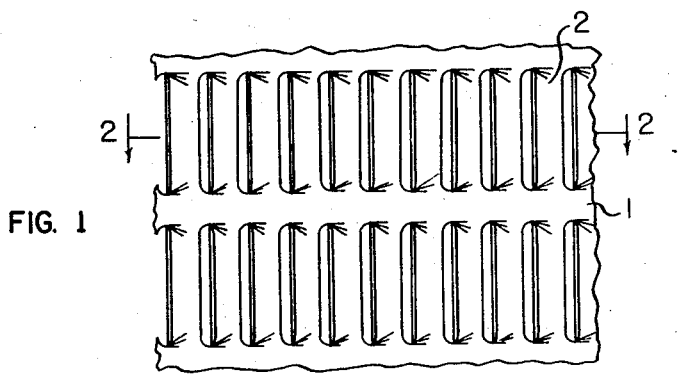
Fig. 1 is a fractional plan view of a filter surface as used in a construction according to the invention.

Referring now to the figures in detail, the filter as shown in Fig. 1 comprises a sheet made of metal or any other suitable material in which a plurality of perforations or slots are provided. These slots are formed by deflectors or tongues 2 bent-off at an angle of about 30° to 90° with the plane of the filter surface. Fig. 2 shows a tongue angle of 45° which has been found to cause the maximal amplitude of the desired wave movement of a gaseous fluid current containing solid particles to be separated, for instance of a gas or air current containing dust particles. Tests have shown that tongue angles should preferably be selected between 30° and 60°. Figs. 1 and 2 show that the slots are disposed substantially perpendicular to the general duct axis and parallel to each other. These figures also show that the parallel slots are arranged in close proximity one with the other. As can best be seen in Fig. 2, the duct wall portions remaining between each two parallel slots correspond to substantially the thickness of the tongues bent out of the duct wall material. Fig. 2 also shows that the length of the individual tongues is so selected that the outer edge of each tongue is short of the forward edge of the respective slot, as seen in the direction radially to the general duct axis. The gas current is directed against the filter surface in the direction $w$. In the diagram according to Fig. 2a, reference character $w$ designates the velocity and also the direction of the gas current, the velocity component of the gas current substantially parallel to the filter surface is designated by $w_1$ and the velocity component substantially vertical to the filter surface is designated by $w_2$. The ratio $w_2/w_1$ is shown as being 1:10. Particularly advantageous results can be obtained when this ratio is selected within the range of 1:7 to 1:20. The ratio should not be greater than 1:5.

Assuming now that the filter surface is shaped and a gas current is directed against the filter surface in such manner that the previously described wave movement of the gas current is effected, then the desired frequency is attained when the ratio between the magnitude of the velocity (as measured in meters per second) in the direction $w_1$ and the spacing $\delta$ (as measured in meters) between the filter perforations is at least 1,000.

The wave movement within the gas current shall now be discussed and analysed in detail. The current lines as shown in Fig 2 are designed in accordance with the rules of current movements and have been checked by means of photographs of current lines.

The current lines do not only indicate changes in direction but also in changes in speed. Divergent current lines correspond to or indicate reduced velocity (retardation) while convergent current lines indicate increased velocity (acceleration). A close analysis of the current line picture shows that velocity changes are synchronized with directional changes in a definite manner.

Fig. 3 shows which section of the orbit or path of the wave movement of the gas or air current is retarded and which portion is accelerated. The graph indicates the points of minimum and maximum velocity.

Figs. 4 and 5 show the direction of the aerodynamic friction affecting a particle which is so small that it is capable of completely following the orbit or path of the gas current. Whenever a particle passes a filter perforation, it is exposed to two impulses of a force, one in the direction $c$ and the other in the direction $d$. When the frequency of these impulses $c$ and $d$ is sufficiently large, the impulses have a resultant $r$ which, as shown on Fig. 6, is directed away from the filter surface. In this connection, it should be noted that impulses $c$ and $d$, as shown in Fig. 6, do not designate the force at the moment at which it has reached its maximum value but the average value of the force as a function of time so that resultant $r$ is equivalent to a continuously acting force. To obtain this equivalence, it is of course also necessary to enter the direction of impulses $c$ and $d$ for an average direction (calculated according to certain methods known in the art) for a period of retardation and acceleration.

The directions of force, as illustrated in Figs. 4 and 5, are based on the presumption that the orbit of a particle is the same as the wave movement of the gas current. In practice, however, the orbit of a particle differs more or less from the actual wave movements of the gas current. This difference is of greatest importance for the aerodynamic effect here involved.

The graph of Fig. 7 shows how the direction of the force would be in the event a particle is so heavy that it travels along a straight path within a pulsating gas current and without varying its velocity. Two positions 1 and 2 of a particle relative to a wave or undulating movement of the gas current shall now be considered, to wit, a particle positioned in the middle of the downwardly directed (retarded) section of an undulating current and a second particle positioned in the middle of the upwardly (accelerated) section of the current. The average path of the current is assumed to coincide with the orbit of the particle and the average velocity of the current to be equal to the particle velocity. For both particle positions, direction of movement and velocity of the particle are designated by $a$ and $a'$ respectively and direction of movement and velocity of the surrounding gas or air by $b$ and $b'$ respectively (in both cases relative to the filter surface). The movement of gas or air relative to the particle is then represented by the component $c$ and $c'$ respectively. The force of aerodynamic friction influencing the particle is downwardly directed for position 1 and upwardly for position 2. Both forces are of equal size and act equally long. As a result, there is no resultant transverse force created in this case, as indicated on Fig 8. As will be apparent, the relation remains the same when the entire orbit of a particle relative to an undulating current is examined. In other words, a resultant aerodynamic force cannot be demonstrated.

The particles with which the present invention is concerned are those of such magnitude that they will not travel along a rectilinear path within the current but will not follow completely the undulations or waves of the current. Such particles, when in a gas current changing its direction and velocity at great frequency, will travel through an undulating orbit which is synchronized with or corresponds to the waves or undulations of the gas current but with a certain lag in phase relative to the direction of the current. As a result, the particle will reach its maximum velocity slightly later than the gas current during a period of acceleration and also its minimum velocity slightly later than the gas current during a period of retardation. Due to the lag in phase, the particles remain in the gas current component directed away from the filter surface, (rising current) somewhat longer than in the gas current component directed toward the filter surface (falling current) as the particles have a higher velocity in the downwardly directed current than in the upwardly directed current.

The previously described phenomenon resembles somewhat glider flight where the glider is moving fast through areas of falling winds and slowly through areas of rising winds.

The behavior of a particle in a high frequency undulating or oscillating field shows, in addition to the described phenomenon, certain other important characteristics. Due to the substantial oscillations of fine or small particles, the lag in phase has an important effect which will now be described in connection with Fig. 9. The wave curve shown in full line represents an assumed orbit or path of a dust particle in an air current flow which is indicated by dashed lines. The median path of the particle is indicated by a dot-dashed line. The direction of flow is assumed to be from right to left. The undulating movement of the air current is shown as being symmetric to illustrate clearly the influence of the lag in phase. The area of falling current is shown as being equal to the area of rising current. The magnitude and direction of the aerodynamic force affecting the considered particle is determined by the relative movement $c$ between the particle and the surrounding air. This movement has been analyzed for points 1 to 8 along the particle path ($a$ is movement of particles; $b$ is movement of air; $c$ is resultant.) The particle reaches its maximum velocity at point 2 and its minimum velocity at point 6. Points 1, 2, 3 and 7, 6, 5 are selected in positions symmetrically relative to one another so that they correspond to each other on respective sides of the meridian line. The particle path traverses the median line at points 4 and 8, point 4 being on the downwardly directed path section and point 8 on the upwardly path section. Point $1a$ corresponds to point 1. The distance between these two points represents one total wave length. The lag in phase between the wave movement of the particle and of the air current corresponds to one eighth of the wave length in the selected example. This lag in phase disturbs the symmetry of the cycle. In point 1, the direction of movement of the air relative to the particle is accelerating in horizontal direction and in point 5 retarding in horizontal direction. Consequently, the direction of the air current at which the latter strikes the particle has a downwardly directed component only between points 1 and 3. Two different areas of falling current can be clearly distinguished: The "area of absolutely falling current" (AF) relating to the current direction relative to the filter surface, and the "area of relatively falling current" (RR) relating to the current direction relative to the particle. Hence, the area of relatively falling current is the section of the particle path in which the particle is subjected to a current directed downwardly, that is the area in which the direction of the current flow has a downwardly directed component.

When the area of relatively falling current is examined, it will be found that this area is reduced to a small fraction of the total wave movement of the particle due to the lag in phase while simultaneously the area of relatively rising current (RR) is correspondingly enlarged.

As was previously mentioned, a particle has a higher velocity in the area of rising current than in the area of falling current. This is shown on Fig. 9 which further shows that the area of falling current coincides with the section of the particle path in which the particle velocity reaches its maximum.

The resultant aerodynamic force of friction affecting the particle during a total wave length or period of oscillation is obtained from an average value of force, direction and time calculated for the different points of the particle path or orbit.

With these observations in mind, a comparison of the area of relatively rising current with the area of relatively falling current will demonstrate that the upwardly directed aerodynamic forces exceeds the downwardly directed force. As a result, the median direction of a particle will not coincide with the median direction of the air current as has been assumed in Fig. 9 for sake of simplicity. Even if one assumes that a particle enters a pulsating air current in the direction of the median line of this air current, the median line of the particle will be deflected upwardly due to the influence of the upwardly directed aerodynamic transverse force, as previously demonstrated. Due to the deflection of the median path of the particle in upward direction, diversions between the median directions of the particle and of the air current will occur so that downwardly and upwardly directed aerodynamic forces finally become equal and neutralize or balance one another. The particle has then reached its maximum velocity of climbing $w_s$ max. in the pulsating air current. (The weight of a particle is disregarded in this connection as it is insignificant in comparison with the aerodynamic forces of the high frequency air current.)

As shown on Fig. 2, the pulsations of the air current are at a maximum closely adjacent to the filter surface and decline with increasing distance from the filter surface. Consequently, the velocity of climbing of a particle is highest closest to the filter surface and decreases with increasing distance therefrom.

If the medium direction of the air current were parallel to the filter surface, particles with decreasing velocity of climbing would be biased toward current lines which have the least curvature, or in other words, the largest distance from the filter surface. However, the direction of the air current is not parallel with the filter $d$. Furthermore, a particle has the position in the pulsating air current which has been assumed herein only at the entrance side of the filter surface. Most of the particles approach the filter surface in the direction $w$ (Fig. 2a) and thus reach successively stronger wave movements. Heavier particles are not appreciably affected by the wave movement (see Fig. 7) but continue to travel substantially rectilinearly until they collide with the filter surface by which they are thrown back. The small or fine particles which are suspended in the air current and are affected by the high frequency pulsations, as it is intended, are deflected from the direction $w$ so that they float along and above the filter surface at a distance at which the velocity of climbing $w_s$ of a particle corresponds to the velocity component $w_2$ of the air current directed toward the filter surface. Consequently, the premise for maintaining particles floating above the filter surface is that the downwardly directed component $w_2$ does not exceed the maximal velocity of climbing $w_s$ max. of a particle closely adjacent to the filter surface. In the event the component $w_2$ exceeds the velocity of climbing $w_s$ max., the particles will come in contact with the filter surface. As $w_2$ increases relative to $w_s$ max., the finest particles begin first to penetrate through the filter perforations while the coarser particles are thrown from one tongue 2 to another one until finally the coarser particles are separated by being thrown back on the filter surface after having struck against the tongues in the perforations.

As will appear from the previous explanations, it is essential for the invention that an oscillating or pulsating movement of the air current relative to the filter surface is produced in which the above stated ratio between the velocity components $w_2$ and $w_1$ is substantially maintained across the entire length of the filter. The portion of the filter surface adjacent to the particle discharge means is particularly sensitive to a value of $w_2/w_1$ which is too high. At this section of the filter, the major portion of the separated particles is concentrated in a heavy layer in the vicinity of the filter surface. Hence, a too high ratio $w_2/w_1$ would cause this major portion of the particles which was previously retained by the described aerodynamic effect to penetrate through the filter perforations.

Extensive tests have shown that when about 10% of the perforations of the filter were clogged adjacent to the dust discharge, more than five times as much dust passed through the remaining filter perforations than did when all filter perforations were clear. The current velocity in the dust discharge was always the same in each test. However, due to the partial clogging of the filter perforations the velocity ratio $w_2/w_1$ was altered for the clear portion of the filter in that the component $w_1$ became smaller and the component $w_2$ greater at this filter portion. The current velocity within the filter perforation is always higher than the velocity $w_2$ which corresponds to the current velocity toward the filter surface. (The total area of the filter perforations being always smaller than the total filter area.

Even if the velocity ratio $w_2/w_1$ is correctly selected, there is a danger that particles approaching a filter perforation are sucked through this perforation due to the drop in pressure therein. To prevent such passage of a particle through a filter perforation by the aerodynamic impulses directed away from the filter surface as produced by the pulsating air current, it is essential that these useful aerodynamic impulses recur at such short intervals so that a particle cannot be sucked through a filter perforation during the time interval between two useful impulses. Such necessity of useful impulses recurring at a high frequency further illustrates the importance of employing a gas or air current having oscillations at a frequency rate according to the invention.

The previously discussed unfavorable change of the velocity ratio will also occur at the filter and adjacent to the discharge means when the current velocity within the discharge means is lower than the velocity component $w_1$ in the filter. Such reduction of velocity will occur unless special precautions are taken to prevent the same. According to a now preferred embodiment of the invention a suction means such as an aspirator or ventilator is connected with the discharge means duct. This suction means effects a drop of pressure in the discharge means so that the pressure in the latter is lower than on the anterior filter surface.

It is further advisable to provide means for controlling the drop in pressure. These means may comprise a manometer of the liquid column type which measures the difference in pressure between the entrance for gas or air to be filtered and the discharge means. This manometer should always indicate a drop in pressure and an increase in pressure should never be admitted to secure proper operation. Such manometer is of importance in practice as an increase in pressure can be caused due to an increase of the flow resistance within the discharge means which increase can not be ascertained without a manometer.

In order to exploit the aerodynamic component directed away from the filter surface for the separation of particles, a discharge means is provided immediately adjacent to the filter surface. Without such discharge means, the continuous deposition of particles on the filter surface would finally cause particles to penetrate the filter perforations. However, even if a discharge means is provided and a correct current velocity as previously explained, is maintained therein, the result will merely be the flow of a branch current with increased particle or dust contents through the discharge means. According to constructions, as hitherto used, the particles are finally separated by directing the branch current into a secondary separator in which the final separation takes place substantially by gravity. As such gravity chamber has a comparatively poor efficiency, it is conventional to guide the branch current back to the gas or air entrance of the primary separator so that the particles which were not deposited in the secondary separator are again separated in the primary separator.

At first glance it might be assumed that particles are compelled to circulate between the primary separator and the secondary separator until finally all particles are precipitated in the secondary separator so that the poor efficiency of the secondary separator is without great importance in practice. However, a more thorough analysis shows that the total efficiency $\eta_{1-2}$ of the separator is determined by the efficiency $\eta_1$ of the primary separator and the efficiency $\eta_2$ of the secondary separator according to the equation:

$$\eta_{1-2}=\frac{\eta_1\cdot\eta_2}{1-\eta_1(1-\eta_2)}$$

This equation indicates that the difference between the efficiency of the primary separator and the secondary is not very important as long as this difference is not very substantial. In separators, as hitherto known, the primary separator is not capable of separating very fine floating or suspended particles with which the present invention is primarily concerned, to any substantial extent. Consequently, it was without importance that the gravity chamber employed as secondary separator is also not capable of separating such fine particles. This situation is changed with a separation according to the invention. As previously mentioned, the invention is primarily concerned with dust which is of such small magnitude that it remains floating or suspended for a substantial period of time even in quiet or static air (particles of the magnitude of $^1/_{100}$ mm. and a specific weight of 1 g./cm.$^3$ have a velocity of fall of only about 3 mm./sec. in a room in which the air is maintained substantially quiet). If now the gravity chamber employed as secondary separator cannot separate such fine particles, the entire separator is of little use even though the described circulation is maintained between the primary and the secondary separator. The only effect of such circulation would be that the concentration of dust particles on the filter surface is increased to such an extent that as many dust particles penetrate through the filter perforations as enter the primary separator. In other words, the filter surface is overloaded with dust particles penetrating through the filter perforations, since the aerodynamic component directed away from the filter surface cannot carry or support an unlimited quantity of filter particles.

As will be apparent from the previous discussion, the construction of the secondary separator is of great importance for the attainment of the desired result.

According to a now preferred embodiment of the invention the secondary separation is carried out by means of a separator of the cyclone type which is connected to a particle collecting receptacle disposed beneath the cyclone separator. The provision of such collecting receptacle in which the final separation takes place is at least of the same importance as the connection of the discharge duct of the primary separator with a cyclone separator. If the separator dust particles would be accumulated between collections in the cyclone separator proper, the finer particles would be raised up in the cyclone separator due to the unavoidable particle spout (entailing the previously mentioned disadvantages). The inventor has found that the best way to avoid such effect is to accumulate the dust not within the cyclone separator proper but in a collecting receptacle disposed beneath the same. It should be understood that the precipitation of dust particles in the receptacle takes place due to gravity but a repeated raising up of dust will not occur or at least it will be insignificant as the flow of current in the collecting receptacle is slight due to the interposed cyclone separator.

Furthermore, any dust particles which are raised up in the collecting receptacle are not directly returned to the primary separator but must first pass the cyclone separator in which the major portion is immediately again separated.

In an operation, as hereinbefore described, the dust contents of dust carrying gas or air is increased by three steps, first in the filter, then in the cyclone separator and finally in the collecting receptacle. In the receptacle, the dust particles are concentrated in such a small volume of gas or air that the final separation is fully effective. Viewed mathematically, the operation takes place about as follows: Let it be assumed that the secondary volume of gas consists of about $1/20$ of the primary volume of gas and that the circulation between the cyclone separator and the collecting receptacle is about $1/20$ of the volume of gas flowing through the cyclone separator, then the quantity of gas circulating in the receptacle is only about $(1/20)^2 = 1/400$ of the primary volume of gas.

Figure 10:
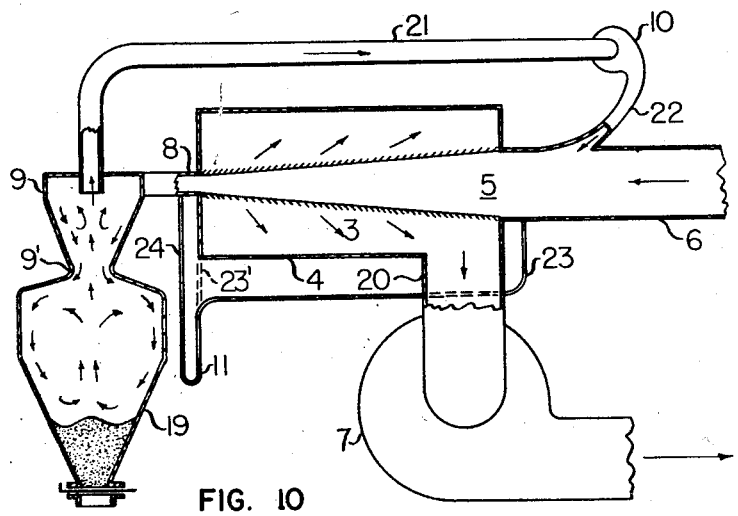
Fig. 10 shows diagramatically a construction according to the invention.

A now preferred embodiment of a construction according to the invention is shown in Fig. 10.

According to this figure, the primary separator includes a filter comprising a cone-shaped duct 3, the wall of which is perforated as shown in Figs. 1 and 2. The cone is mounted in a housing 4. Gas containing dust particles to be separated is admitted into the filter cone at the wide end 5 thereof. This filter end is connected by a pipe line 6 with the source of the dust to be separated such as a mill, a dust producing machine or a smoke conduit. The suction means for sucking the gas through the filter, such as a suction pump 7 or a ventilator, is connected to housing 4 by a pipe 20, thereby protecting the suction pump against the intrusion of dust. The main portion of the filtered gas is sucked off through the filter perforations and discharged through pump 7. The minor portion of the gas current (the secondary volume of gas) is conducted toward a discharge duct 8 which is disposed immediately adjacent to the filter cone 3 at the narrow end of the latter so that the secondary volume of gas passes through the entire length of the filter. Discharge duct 8 is connected to the secondary separator comprising a separator 9 of the cyclone type from which the gas, after a fraction of the particle contents has been separated, is sucked off by means of a second suction pump or ventilator 10 through a pipe 21. The gas is then returned into the filter cone 3 through a pipe 22 which connects with pipe 6 near the entrance end 5 of the filter cone. As a result, the secondary gas is circulated within a system comprising a primary and a secondary separator. The volume of secondary gas should be less than 10%, preferably not more than 8%, of the volume of gas primarily admitted into the filter. The effective area of the discharge duct should have a definite relation to the volume of secondary gas in view of the requirements of velocity as previously explained. The cross sectional area of the discharge duct should be not more than between 5 and 8% of the cross section of the filter cone at the entrance end thereof. The perforation of the filter cone extends up to the beginning of the discharge duct, as indicated in Fig. 10, and the filter should be connected to the discharge duct without an intermediate pipe section as such intermediate section may cause a stagnation of the flow of gas. A manometer 11 of conventional design is connected by tubes 23 and 24 with the entrance end and the exit end of the filter cone to measure the difference in pressure between these points. As previously explained, this difference in pressure should always have a positive value, or in other words a drop in pressure should occur across the length of the filter.

It should be noted that the manometer can also be employed to measure the difference in pressure between discharge duct 8 and housing 4, as is indicated by a dotted tube 23'. If the pressure in the discharge duct is maintained as high as the pressure in the housing of somewhat lower, then the required margin of safety is secured as to the velocity of the gas in the discharge duct.

Cyclone separator 9 is connected at its lower end through an outlet 9' of reduced cross section with a dust collecting receptacle 19. The gas will rotate in this receptacle with a velocity lower than the gas velocity in separator 9. Simultaneously with this rotation, a flow of current occurs in separator 9 as well as in receptacle 10. This flow of current is in the nature of a particle spout as indicated by arrows. As the cyclone separator is open at the bottom so that dust cannot accumulate in the same, the spout within the cyclone separator cannot raise up separated dust particles. The spout in receptacle 19 will of course affect the dust accumulating at the bottom of the receptacle. However, as this spout is much weaker than the spout in separator 9, the raising up of separated dust particles will be much smaller than if the dust would be accumulated in separator 9 proper. Furthermore, the major portion of the dust particles sucked on by the spout either in the cyclone separator or in the collecting receptacle is separated again before it can reach the outlet opening at the upper end of separator 9. As a result, the collecting receptacle operates to a certain extent also as a cyclone separator even though the dust is actualy precepitated by gravity at the bottom of receptacle 19.

Extensive tests have shown that by combination of a primary separator employing a high frequency gas current and a spacing of 2 to 20 mm. of the filter perforations at a gas velocity of 12 to 25 m./sec. and a secondary separator designed for a minimal raising up of separated dust particles, the effect of the high frequency oscillations of the gas current upon the separation of particles contained in the said current can be further improved.

While the invention has been described in detail with respect to a certain now preferred example and embodiment of the invention it will be understood by those skilled in the art after understanding the invention, that various changes and modifications may be made without departing from the spirit and scope of the invention and it is intended therefore, to cover all such changes and modifications in the appended claims.

What is claimed as new and desired to be secured by Letters Patent is:

1. In a separator for separating solid particles of a magnitude down to $10\mu$ (at a volumetric weight of 1 g./cm.$^3$) suspended in a particle laden gas current, the combination of an elongated, substantially rigid filter duct decreasing in cross-section from one end toward the other, the angle between the duct wall and the general duct axis being at most 15°, said duct wall including louvered slots distributed over substantially the entire length of the duct, said slots being disposed substantially perpendicular to the general duct axis and substantially parallel to each other and in close proximity, the spacing between each two parallel slots being at most 0.016 m., a deflector extending outwardly from the rear edge (as seen in the direction of the current flow) of each slot toward the wide duct end at an angle of at least 30° relative to the duct wall, the relation between the total area of the slots in the duct wall and each cross-section of the filter duct being so selected that the total area of filter duct slots behind each filter duct cross-section, as seen toward the narrow filter duct end, is greater than the selected filter duct cross-section minus the cross-sectional area of the discharge duct; particle discharge means connected to the narrow duct end; pump means operative and set to direct through the duct from the wide end thereof toward the narrow end a particle laden gas current with a velocity of at least 16 m./sec., said current, when passing through the duct, experiencing high frequency oscillations in accordance with the equation:

$$\text{frequency} = \frac{v}{\delta}$$

wherein the frequency is at least 1000 oscillations/sec., the velocity $v$ is at least 16 m./sec., and the spacing $\delta$ of the slots is at most 0.016 m. for setting up an aerodynamic force directed away from the louvered duct wall and counteracting the component of the aerodynamic force tending to drive particles below a certain magnitude through said slots, thereby forcing the said particles away from the louvered duct wall and maintaining the particles floating in the oscillating gas current; and circulation pump means having a suction conduit connected to said discharge means and a return conduit connected to the wide duct end, said circulation pump means being operative and set to maintain the gas current velocity at the narrow duct end at least equal to the current velocity along the louvered duct wall for maintaining said aerodynamic force directed away from the louvered duct wall.

2. A separator as described in claim 1, wherein the outer edge of the deflector of each slot is short of the forward edge of the respective slot, as seen in the direction radially to the general duct axis.

3. A separator as described in claim 1, wherein said discharge means include a discharge duct connected to the narrow filter duct end, and wherein the cross-section of said narrow filter duct end is at most 8% and at least 2% of the filter duct cross-section at the wide end of the filter duct.

4. A separator as described in claim 1, wherein said discharge means include a centrifugal particle collector connected to the filter duct at the narrow end thereof.

5. A separator as described in claim 1, wherein said discharge means include a centrifugal particle collector connected to the filter duct at the narrow end thereof and a centrifugal and gravity particle collector disposed below said centrifugal particle collector in communication with said last-mentioned collector through a throat comparatively narrow relative to the average cross-sectional area of the collectors.

6. In a separator for separating solid particles of a magnitude down to $10\mu$ (at a volumetric weight of 1 g./cm.$^3$) suspended in a particle laden gas current, the combination of an elongated, substantially rigid filter duct decreasing in cross-section from one end toward the other, the angle between the duct wall and the general duct axis being at most 15°, said duct wall including louvered slots distributed over substantially the entire length of the duct, said slots being disposed substantially perpendicular to the general duct axis and substantially parallel to each other in so close proximity that the duct wall portions remaining between each two parallel slots are reduced to substantially the thickness of the duct wall material, a deflector extending outwardly from the rear edge (as seen in the direction of the current flow) of each slot toward the wide duct end at an angle of at least 30° relative to the duct wall, the relation between the total area of the slots in the duct wall and each cross-section of the filter duct being so selected that the total area of filter duct slots behind each filter duct cross-section, as seen toward the narrow filter duct end, is greater than the selected filter duct cross-section minus the cross-sectional area of the discharge duct; particle discharge means connected to the narrow duct end; pump means operative and set to direct through the duct from the wide end thereof toward the narrow end a particle laden gas current with a velocity of at least 16 m./sec., said parallel spacing of the louvered slots, said angle of the deflectors, said angle between the duct wall and the general duct axis, and the velocity of said gas current imparting to the said gas current, when passing through the duct, high frequency oscillations with a frequency of at least 1,000 oscillations per second for setting up an aerodynamic force directed away from the louvered duct wall and counteracting the component of the aerodynamic force tending to drive particles below a certain magnitude through said slots, thereby forcing the said particles away from the louvered duct wall and maintaining the particles floating in the oscillating gas current;

and circulation pump means having a suction conduit connected to said discharge means and a return conduit connected to the wide duct end, said circulation pump means being operative and set to maintain the gas current velocity at the narrow duct end at least equal to the current velocity along the louvred duct wall for maintaining said aerodynamic force directed away from the louvered duct wall.

7. A separator as described in claim 1, wherein said discharge means include a centrifugal particle collector, and wherein first conduit means connect said collector to the narrow duct end and second conduit means to the wide duct end for recirculating partly purified gas.

8. A separator as described in claim 1, wherein said discharge means include a centrifugal particle collector and a centrifugal and gravity particle collector disposed below said first mentioned centrifugal particle collector and in communication with the said collector through a throat comparatively narrow relative to the average cross-sectional area of the collectors, and wherein first conduit means connect the upper particle collector with the narrow end of the filter duct and second conduit means with the wide duct end for recirculating partly purified gas through the filter duct.

ERIK TORVALD LINDEROTH.

REFERENCES CITED

The following references are of record in the file of this patent:

UNITED STATES PATENTS

| Number | Name | Date |
|---|---|---|
| 2,034,467 | Haber | Mar. 17, 1936 |
| 2,152,115 | Van Tongeren | Mar. 28, 1939 |
| 2,357,734 | Haber | Sept. 5, 1944 |